United States Patent [19]
Griswold

[11] Patent Number: 5,249,394
[45] Date of Patent: Oct. 5, 1993

[54] CHUCK INDEXING METHOD
[75] Inventor: Roger D. Griswold, Sparland, Ill.
[73] Assignee: Caterpillar Inc., Peoria, Ill.
[21] Appl. No.: 962,558
[22] Filed: Oct. 19, 1992

Related U.S. Application Data
[62] Division of Ser. No. 840,377, Feb. 24, 1992, Pat. No. 5,189,846.

[51] Int. Cl.$^5$ .............................................. B24B 1/00
[52] U.S. Cl. .................................. 51/281 C; 51/281 R
[58] Field of Search .......... 51/281 R, 281 C, 237 CS, 51/105 SP, 216 ND

[56] References Cited

U.S. PATENT DOCUMENTS

| | | | |
|---|---|---|---|
| 2,292,588 | 8/1942 | Terbrueggen | 52/216 ND |
| 2,651,895 | 9/1953 | Rocks | 51/237 CS |
| 2,780,895 | 2/1957 | Silren | 51/216 ND |
| 3,128,582 | 4/1964 | Winther | 51/237 CS |
| 3,584,423 | 6/1971 | Hoare | 51/237 CS |
| 3,646,710 | 3/1972 | Flohr | 51/237 CS |
| 3,680,876 | 8/1972 | Okada | 51/237 CS |
| 3,881,735 | 5/1975 | Joyce | 51/237 CS |
| 4,297,926 | 11/1981 | Russ | 51/237 CS |
| 5,144,772 | 9/1992 | Kawamafa | 51/237 CS |

Primary Examiner—Bruce M. Kisliuk
Assistant Examiner—Bo Bounkong
Attorney, Agent, or Firm—Alan J. Hickman

[57] ABSTRACT

A method for indexing a crankshaft rod to a preselected location includes the steps of rotating the drive shaft to a null position, maintaining the drive shaft at the null position, moving the indexing motor to a drive position, releasing the chuck for rotation about the spindle, rotating the chuck about the spindle, maintaining the chuck from rotation, moving the drive shaft from the drive position, and freeing the drive shaft for rotation.

6 Claims, 7 Drawing Sheets

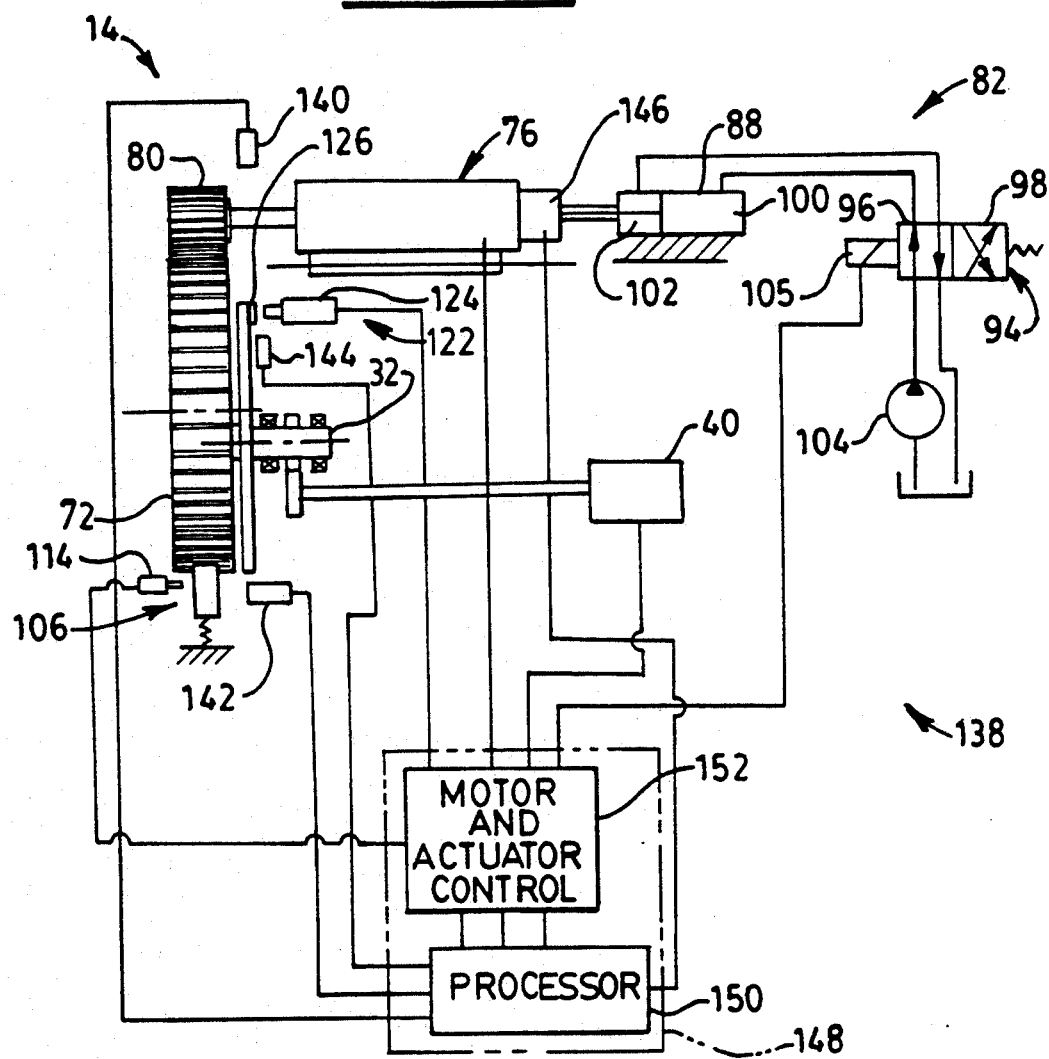

CHUCK INDEXING METHOD

CROSS REFERENCE TO RELATED APPLICATION

This is a division of application Ser. No. 07/840,377, filed Feb. 24, 1992, now U.S. Pat. No. 5,189,846.

TECHNICAL FIELD

This invention relates to a method for positioning a rod bearing journal of a crankshaft at a preselected location relative to an abrasive wheel of a grinder.

BACKGROUND ART

Grinders utilized for finish grinding the rod bearing journals of a crankshaft typically have a pair of spaced pot chucks for holding a crank shaft therebetween. The abrasive wheel of the grinder is positioned axially relative to one of the rod bearing journals for grinding of that particular rod bearing journal. During grinding both the abrasive wheel and the pot chucks rotate so that a smooth cylindrical surface may be obtained. To grind the next rod bearing journal the abrasive wheel is moved axially into alignment with the rod bearing journal to be machined and the rod bearing journal is indexed to the next desired location. Indexing of the crankshaft is achieved by a fixed gear set. Because the gear set is fixed, the indexing of the crankshaft is only applicable for the machining of a particular crankshaft configuration, for example, a crankshaft having four rod bearing journals.

To grind a crankshaft having a number of journals greater or less than the existing setup requires replacement of the existing gear set with a gearset having a different ratio. Thus, each crankshaft type requires a different gear ratio. For example, to grind a crank shaft with six rod bearing journals instead of four, a gear set capable of indexing the crankshaft to each of the six locations rather than four is required. Converting from one gear set to another requires several manhours of time in tear-down and setup. Making such a conversion is thus costly as it is manpower intensive and reduces overall productivity of the grinder.

Further, since the conversion from one crank shaft configuration to another is time consuming the flexibility of running small lots of crankshafts is eliminated. To alleviate this problem a separate grinder is often dedicated for each crankshaft configuration to be ground. This of course contributes to inefficiency and an increased cost of the crankshafts being produced.

In certain types of existing commercially available manual grinders the distance provided between the head and tail stock of the grinder is often less than necessary to permit the aforementioned indexible pot chucks to be used. This is due to the fact that the complicated indexing gear sets discussed above are massive and utilize much of the space available between the head and tail stocks. Thus, the remaining available space between the pot chucks is not adequate to permit a crank shaft to be supported therebetween.

Engines of today require that closer tolerances be maintained in the manufacture of various components, such as crank shafts, in order to meet operating specifications, such as particulate emission standards. Manually indexible grinders are difficult to adjust and difficult to hold tight tolerances with. Thus, increased scrap is produced which wastes resources but also drives up prices.

The present invention is directed to overcoming one or more of the problems as set forth above.

DISCLOSURE OF THE INVENTION

In one aspect of the present invention, a method for indexing a crank shaft bearing journal to a pre-determined location relative to a rotatable abrasive wheel of a grinder, comprises the steps of: rotating a drive shaft carrying a pot chuck supported crank shaft on the grinder to a pre-determined null position; engaging a first latch and maintaining the drive shaft at the null position; moving an indexing motor to a gear engaging drive position; releasing a second latch from engagement with the gear and freeing the pot chuck for rotation about a chuck spindle connected axially offset to the drive shaft; actuating the indexing motor and rotating the pot chuck supported crank shaft to a desired bearing journal position relative to the abrasive wheel; engaging the second lock with the gear and maintaining the pot chuck supported crank shaft from rotation relative to the drive shaft; moving the indexing motor to a position spaced from engagement with the drive gear; and disengaging the first latch and freeing the drive shaft for rotation.

Since the indexing motor is movable between the first and second positions relative to the gear and the first latch is movable between its first and second positions the ability to index any crank shaft type, for example a crankshaft having four, six, eight or twelve rod bearing throws, without any hardware modifications, is possible.

The indexing device is suitable for installation on existing grinders having a drive shaft. Thus, the ability to upgrade a grinder to accept different types of crankshafts is possible. As a result a substantial amount of cost savings is achieved. The upgrade cost is a fraction of the cost of a complete new grinder.

The control means automatically provides proper sequential operation of the indexing function and the accuracy needed for rod bearing journal placement. The proper sequencing involves control of the indexing motor position and rotation, first and second latch movement, and drive motor. Feedback from the sensing means and the encoder insures accuracy of positioning and the sequential operation.

BRIEF DESCRIPTION OF THE DRAWINGS

FIG. 7 is a diagrammatic schematic embodiment of a control system for controlling the indexing device.

BEST MODE FOR CARRYING OUT THE INVENTION

Figure 1:
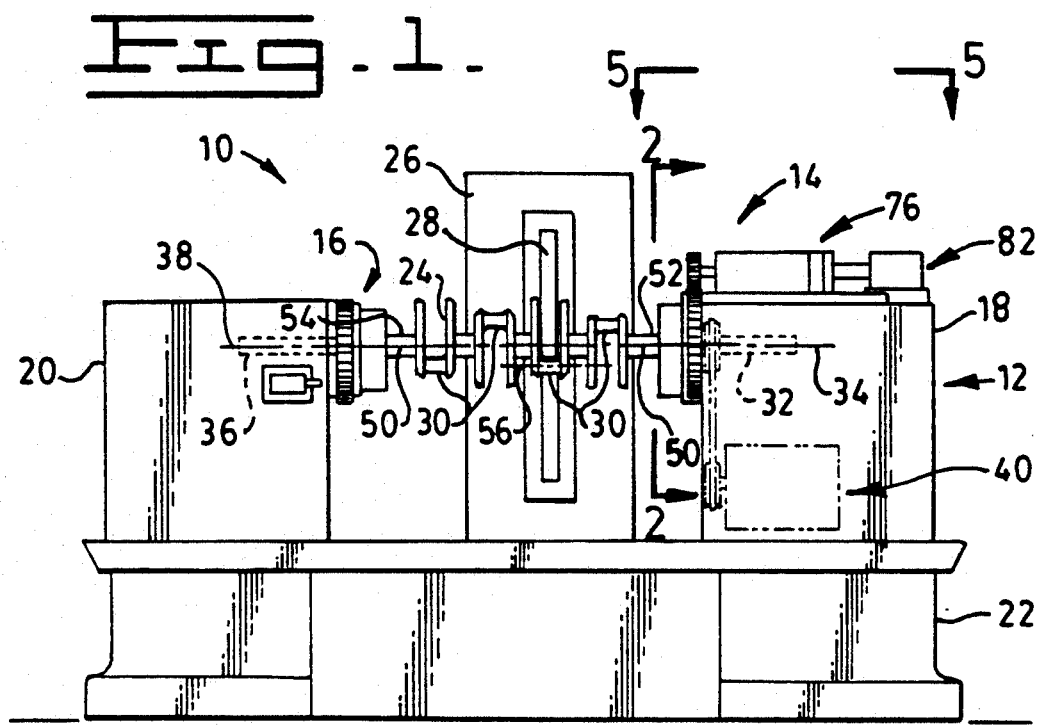
FIG. 1 is a diagrammatic elevational view of and embodiment of the present invention showing a grinder and an indexing device mounted on the head end of the grinder for positioning a crank shaft relative to the abrasive grinder wheel.

With reference to the drawings, and particularly FIG. 1 an indexing arrangement 10 for a grinder 12 is shown. The indexing arrangement 10 has first and second indexing devices 14,16 connected to head and rear tail stock portions 18,20 of the grinder frame 22. The first and second indexing devices 14,16 axially face each other and support a crankshaft 24 therebetween. The grinder frame 22 has an intermediate portion 26 located between the head and tail stocks 18,20. The intermediate portion 26 has an abrasive grinding wheel 28 rotatably mounted thereon. The abrasive grinding wheel 28 is positionable at any desired longitudinal location between the head and tail stocks 18,20 so that the abrasive grinding wheel 28 may be aligned to grind each of a plurality of rod bearing journals 30 of the crankshaft 24.

A drive shaft 32 having a longitudinal axis 34 is rotatably connected to the head stock 18 in any suitable manner, and a tail shaft 36 having a longitudinal axis 38 is rotatably connected to the tail stock 20 in any suitable manner. The drive and tail shaft axes 34,38 are axially aligned with each other and substantially parallel to the axis of rotation of the abrasive grinding wheel 28. Thus, the grinding wheel 28 extends from the intermediate frame portion 26 radially normal to the axes 34,38. The abrasive grinding wheel 28 is powered by a drive motor (not shown) in a conventional manner. The drive shaft 32 is powered by a drive motor means 40 of any conventional suitable design. The drive motor means 40 preferably includes an electric motor and a drive mechanism such as a chain and sprocket arrangement of conventional design. The chain and sprocket arrangement connects the electric motor to the drive shaft 32.

As best seen in FIGS. 2-5, the first indexing device 14 includes a chuck spindle 42 having a longitudinal chuck spindle axis 44. The chuck spindle 42 is connected to the drive shaft 32. The chuck spindle 42 has a plurality of stepped portions 46 for carrying bearing means 48 of any suitable design. The bearing means 48 shown includes a pair of tapered roller bearings, however, other anti-friction bearings are to be considered suitable replacements and within the scope of the invention. The chuck spindle axis 44 is substantially parallel to the drive shaft axis 34 and radially offset from the drive shaft axis 34 a pre-determined normal distance substantially equal in magnitude to a normal distance extending from an axis 50 of the first and second main bearing shafts 52,54 of the crankshaft 24 to an axis 56 of any one of the rod bearing journals 30. It is to be noted that the axes 34,38 of the drive and tail shafts 32,36 are axially aligned with each other and the axes 50 of the first and second main bearing shafts 52,54 are axially aligned with each other.

The second indexing device 16 has a chuck spindle 60 which is identical in construction to that of the chuck spindle 42. The chuck spindle 60 is mounted on the tail shaft 36 in an identical manner to the mounting of the chuck spindle 42 on the drive shaft. The chuck spindle 60 has a longitudinal axis 62 which is substantially parallel to the tail shaft axis 38 and radially offset from the tail shaft axis 38 a pre-determined normal distance substantially equal in magnitude to a normal distance extending from an axis 50 of either one of the first and second main bearing shafts 52,54 to a longitudinal axis 56 of any one of the rod bearing journals.

Figure 4:
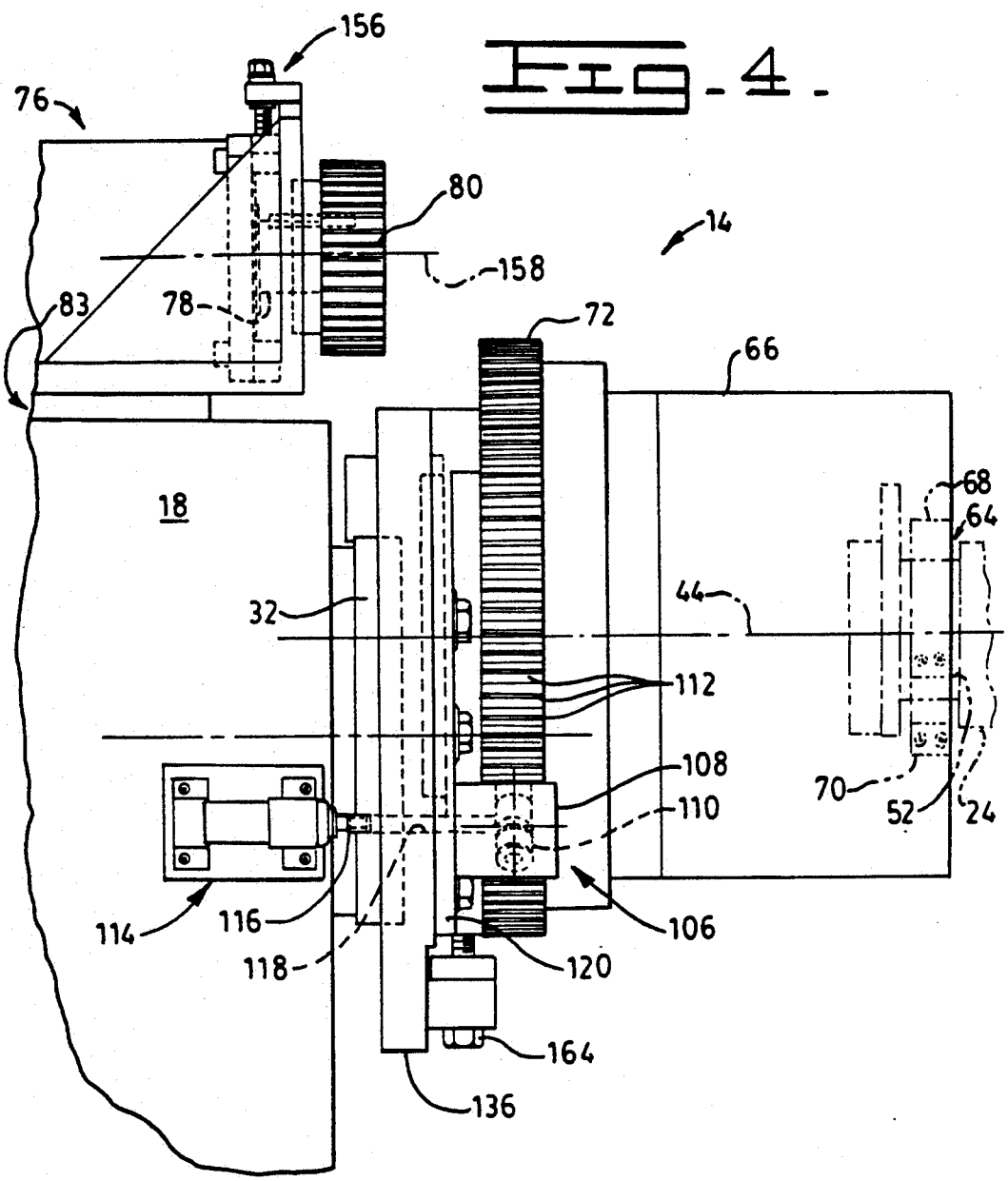
FIG. 4 is a diagrammatic side view of the indexing device taken along lines 4—4 of FIG. 2.
Figure 5:
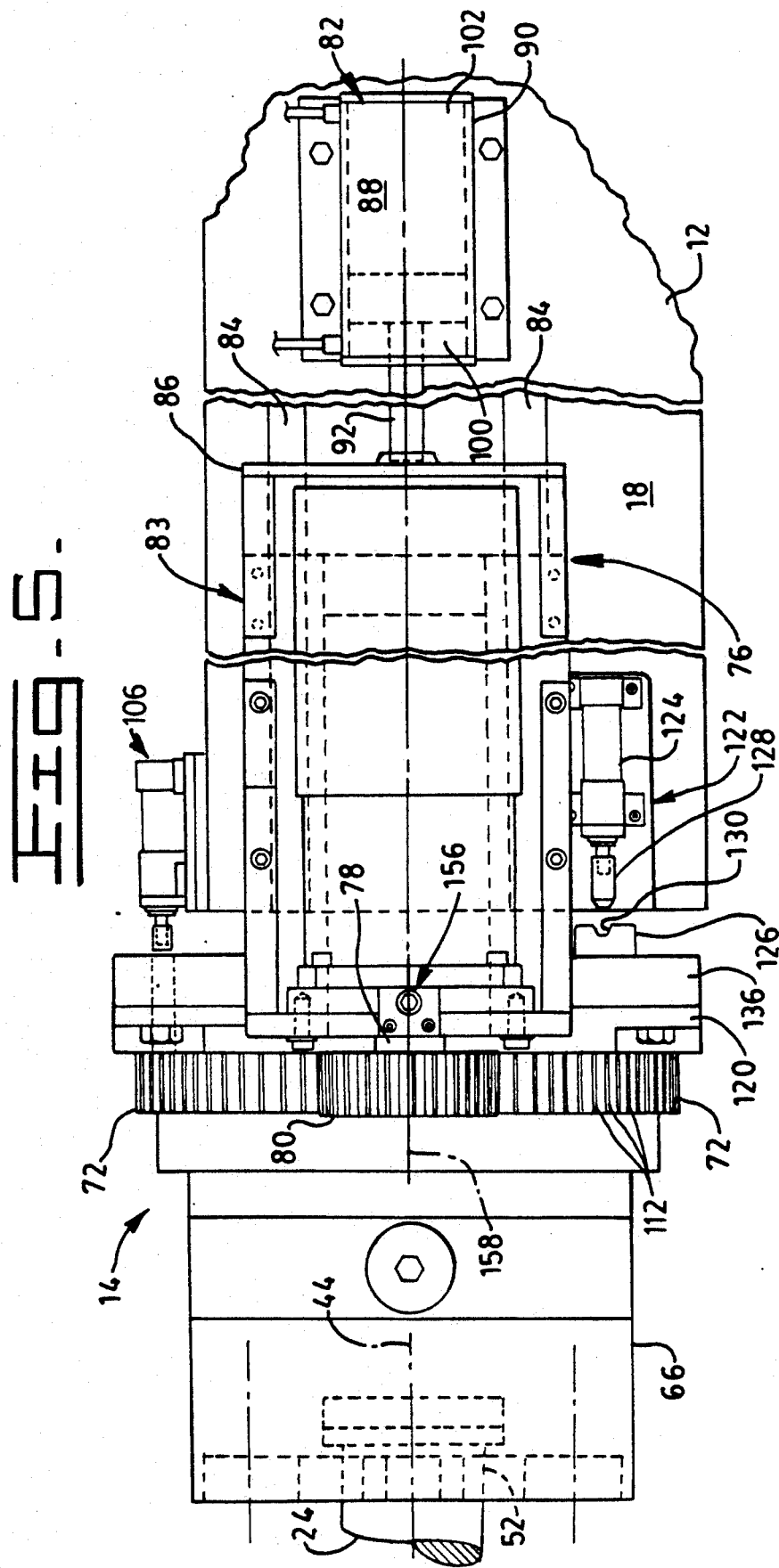
FIG. 5 is a diagrammatic top view of the indexing device taken along lines 5—5 of FIG. 1 showing the indexing device in greater detail.
Figure 6:
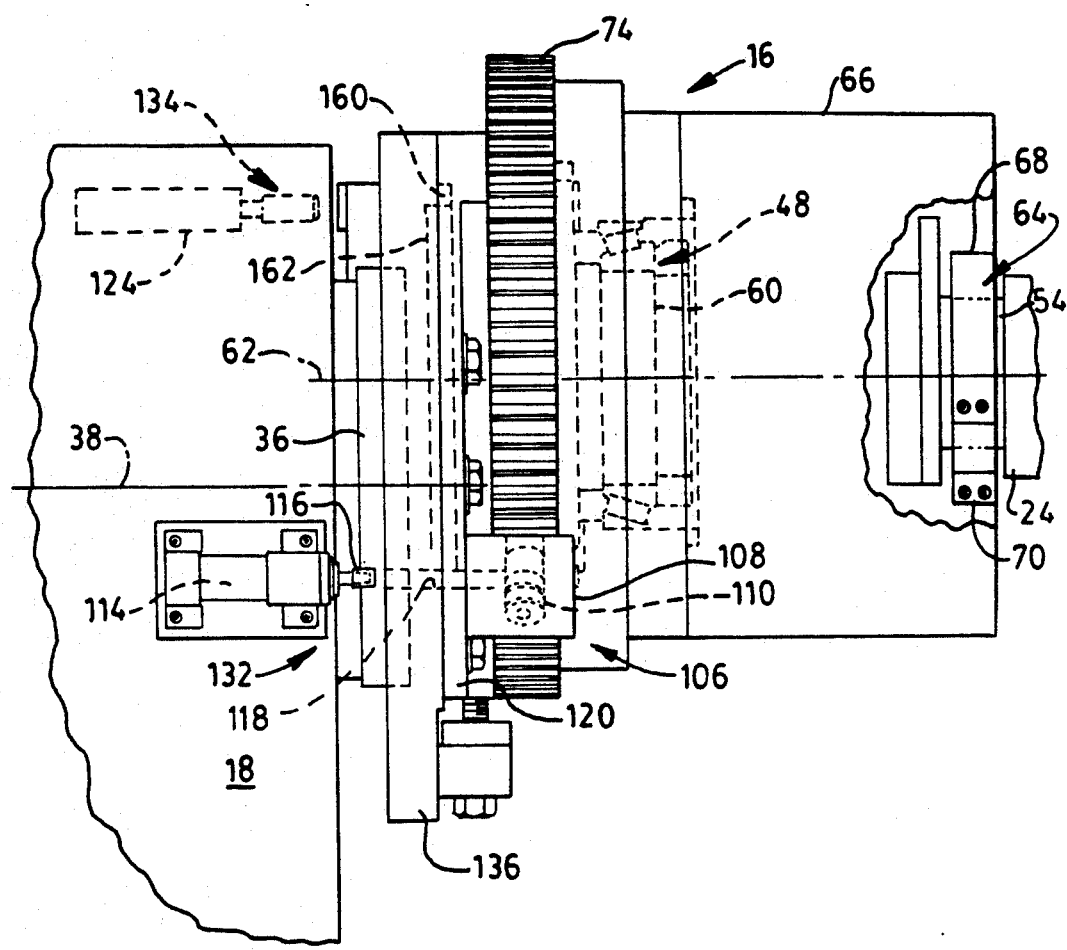
FIG. 6 is a diagrammatic side view of an indexing device mounted on the tail end of the grinder.

The second indexing device 16, as shown in FIGS. 1 and 6 is substantially identical to the first indexing device 14 as shown in FIGS. 1-5. Therefore, all discussion related to the first indexing device will also pertain to the second indexing device, unless otherwise specified.

Figure 2:
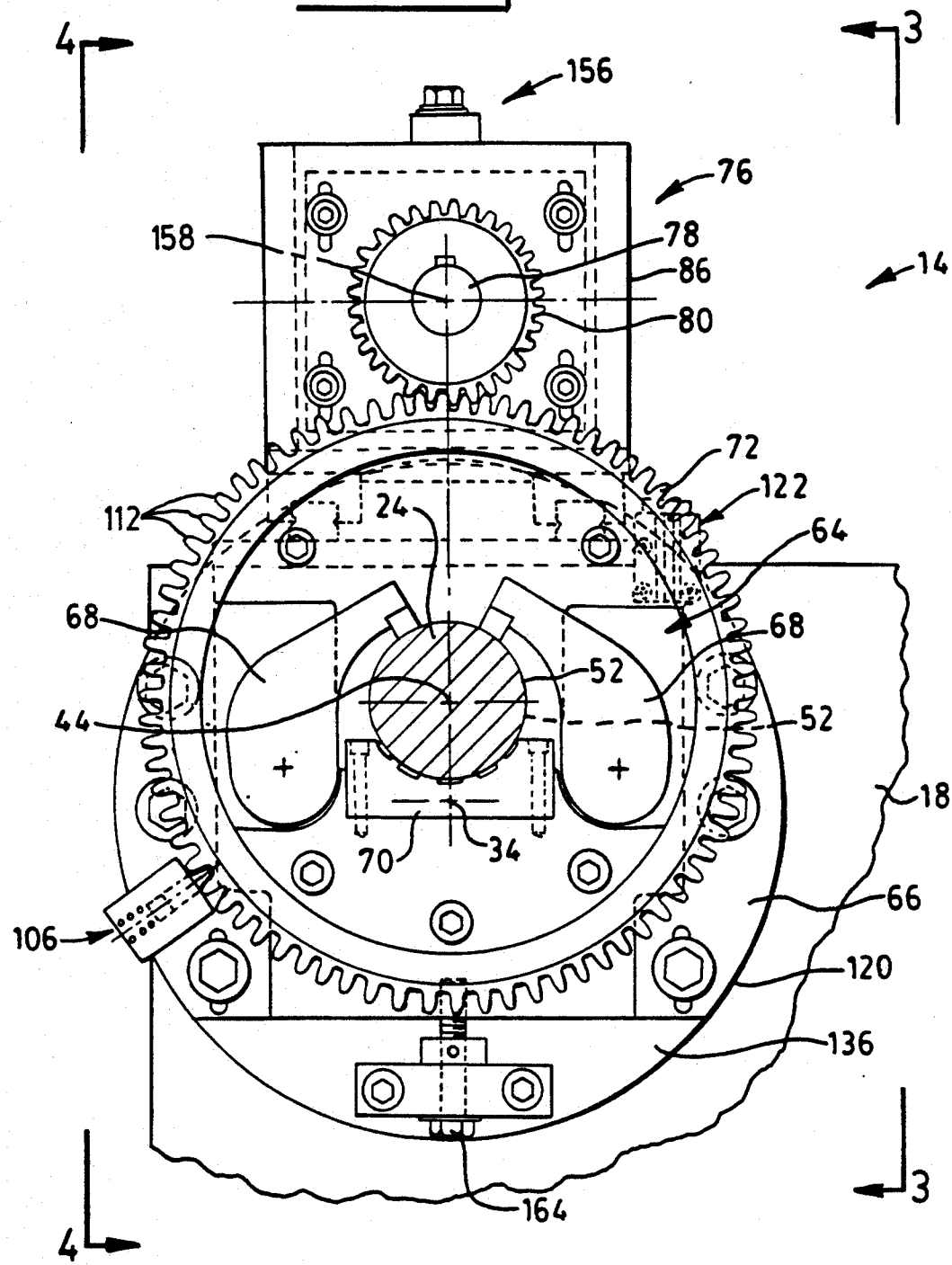
FIG. 2 is a diagrammatic cross section taken along lines 2—2 of FIG. 1 showing the indexing device in greater detail.
Figure 3:
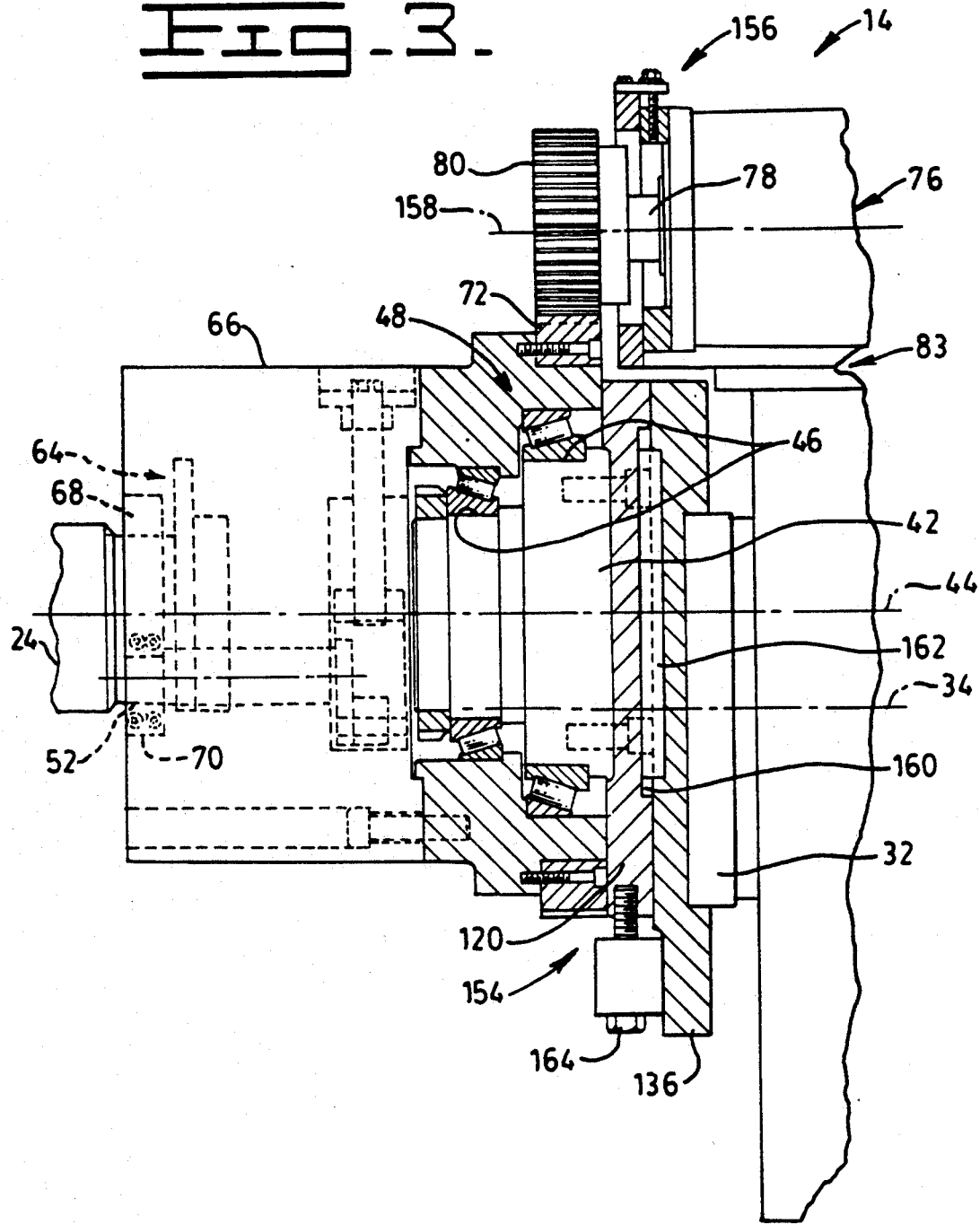
FIG. 3 is a diagrammatic side view of the indexing device taken along lines 3—3 of FIG. 2 with portions broken away to show the indexing device in greater detail.

Referring to FIGS. 2, 3, and 6, a pot chuck 64 has a housing 66, a pair of jaws 68 pivotally connected to the housing 66, and a main bearing supporting cradle 70 connected to the housing. The housing 66 is rotatably connected to the chuck spindle 42 by bearing means 48. Likewise the housing 66 of the second indexing device 16 is rotatably connected to the chuck spindle 60. The cradle 70 supports the first main bearing shaft 52 relative to the chuck spindle axis 44 and the jaws 68 clampingly maintain the first main bearing shaft 52 in the cradle 70 and from movement relative to the housing 66. Similarly, the cradle 70 supports the second main bearing shaft 54 relative to the chuck spindle axis 62 and the jaws 68 clampingly maintain the second main bearing shaft 54 in the cradle and from movement relative to the housing 66. Pot chucks are well known in the art as being capable of accurately maintaining the center positions of shafts for machining purposes. Therefore, no further discussion will be made concerning such devices.

Referring to FIGS. 1-5, a gear 72 is connected to the housing 66 of the first indexing device 14 and rotatable with the housing about the chuck spindle 42. As best seen in FIG. 6, a gear 74 is connected to the housing 66 of the second indexing device 16 and rotatable with the housing 66 about the chuck shaft 60. It is to be noted that gear 74 may be eliminated from the second indexing device 16 without departing from the spirit of the invention. Although a pot chuck is preferred it should be recognized that other chucks are suitable for use and considered within the scope of the invention.

Referring to FIGS. 1-5, an indexing motor means 76 is provided for engaging the gear 72 and rotating the pot chuck 64 about the chuck spindle 42. Specifically, the indexing motor means 76 has a rotatable output shaft 78 and a pinion gear 80 connected to the rotatable output shaft 78 and rotatable with the output shaft 78. The indexing motor means 76 rotates the housing 66 of the second indexing device 16 through the pot chuck 64 clamped crank shaft for indexing purposes.

A power means 82 is provided for moving the indexing motor means 76 relative to the gear 72 between a first position at which the indexing motor means 76 is engaged to rotatably drive the gear 72 and a second position spaced from the first position at which the indexing motor means 76 is free from driving engagement with the gear 72. Specifically, the pinion gear 80 is in mated engagement with the gear 72 at the first position so that rotary power from the pinion gear 80 is transferred through gear 72 to rotate the housing 66 about axis 44. A guide means 83 is provided for movably connecting the indexing motor means 76 to the frame 22 and particularly the head stock 18 of the grinder 12 and guides movement of the indexing motor means 76 between the first and second positions of the indexing motor means 76. The guide means 83 preferably includes a pair of spaced guide rails 84 connected to a top of the grinder frame 22 (head stock portion 18) and a carriage 86 connected to the indexing motor means 76. The carriage 86 is slidably connected to the guide rails 84 for movement along the guide rails 84.

The guide rails are substantially parallel to the chuck spindle axis 44. The indexing motor means 76 preferably includes an electric servo motor of any suitable conventional design.

The power means 82 preferably includes a fluid operated actuator 88 having a cylindrical housing 90 and a piston rod 92 slidably connected to the cylindrical housing 90 and connected to the carriage 86. The fluid operated actuator 88 is connected to and between the indexing motor means 76 and the grinder frame 22. The indexing motor means 76 is linearly movable between its first and second positions, as shown in FIGS. 3 and 4, respectively, in response to extensible movement of the piston rod 92 relative to the cylindrical housing 90.

Referring to FIG. 7, a control valve 94 having first and second positions 96,98 is connected to the fluid operated actuator 88 and adapted to deliver pressurized fluid flow to a head end 100 of the actuator 88 at the first position 96 of the control valve 94 and deliver pressurized fluid flow to the rod end 102 of the actuator 88 at the second position 98 of the control valve 94. The control valve 94 is connected to a source of pressurized fluid flow 10 which provides the pressurized fluid flow from moving the fluid operated actuator 88. The control valve is moved between its first and second positions 96,98 by a solenoid 106. The indexing motor means 76 is movable to its first position in response to the control valve 94 being at its first position. Conversely, the indexing motor means 76 is movable to its second position in response to the control valve 94 being at its second position 98.

It is to be noted that the power means 82 could be replaced by an electrical equivalent of any well-known type suitable for moving the indexing motor means 76 between the first and second positions without departing from the invention.

With reference to FIGS. 2-5, a first latch 105 is connected to the drive shaft 32 and selectively movable between the first position at which the housing 66 of the first indexing device 14 is maintained from rotation about the chuck spindle axis 44 and a second position spaced from the first position at which the housing 66 is free to rotate about the chuck spindle axis 44. Specifically, the first latch 106 includes a latch body 108 connected to the drive shaft 32 and a bolt 110 slidably connected to the latch body 108 and spring biased into engagement between gear teeth 112 of gear 72. It is to be noted that the first latch 106 retains the gear 72 and the housing 66 to which it is connected from rotation on the chuck spindle 42 when the bolt is engaged with adjacent pairs of gear teeth 112. Since the gear 72 has seventy two teeth it is possible to index the pot chuck 64 supported crankshaft 24 in five degree increments and thus provide accuracy positioning of a large assortment of crankshaft types. The first latch 106 also includes an electrical actuator 114 connected to the head stock portion 18. The plunger 116 is movable through an aperture 118 in abutting flanges 120,136 mounted on the drive shaft 32. The plunger 116 is movable between an engaged position with the bolt 110 and a space position from the bolt 110. At the engaged position of the plunger 116 with the bolt 110 the bolt is spaced from engagement with the gear teeth 112 and at the spaced position of the plunger 116 from the bolt 110 the bolt 110 is biased into engagement with selected pairs of gear teeth 112. This motion of the bolt 110 is achieved by a camming wedge action between the plunger 116 and the bolt 110.

As best seen in FIGS. 2 and 5, a second latch 122 has an electrical actuator 124 which is mounted on the head stock portion 18 and a plunger receiving member 126 mounted on the flange 136. The electrical actuator 124 has a plunger 128 which is movable between a first position at which the plunger 128 is engaged with the plunger receiving member 126 and the chuck spindle 42 of the first indexing device 14 is maintained from orbital rotation about the drive shaft axis 34 and a second position spaced from the first position and from engagement with the plunger receiving member 126 at which the chuck spindle 42 of the first indexing device 14 is free to rotate in an orbit about the drive shaft axis 34. The plunger receiving member 126 has a notch 130 disposed therein to receive in seating engagement therewith the plunger 128. The plunger receiving member 126 is positioned on the flange 136 at a preselected location so that when the plunger 128 is engaged in the notch 130 the chuck spindle 42 of the first indexing device 14 is at a preselected 0 degree or null location as shown in FIG. 2. The initial setup of the crankshaft is based on the chuck spindle 42 being at this null or set point location.

It is to be noted that the chuck spindles 42 and 60 are each mounted on their respective flanges 120 and the flanges 136 are mounted on their respective drive and tail shafts 32,36.

With reference to FIG. 6, the second indexing device 16 also has first and second latches 132,134. The first and second latches 132,134 are identical in construction to the first and second latches 106,122, respectively, and are located and function in an identical manner with respect to the gear 74 and the flange 136 connected to the tail shaft 36.

With reference to FIG. 7, a control circuit 138 is disclosed which automatically controls operation of the crankshaft indexing sequences. The control circuit 138 includes means 140 for sensing the position of the indexing motor means and delivering a signal in response to the indexing motor means 76 being at the first position. The sensor means 140 includes a proximity sensor of any suitable well known construction. The proximity sensor 140 is mounted on the frame 22 and senses when the pinion gear 80 is aligned to engage gear 72.

A means 142 is provided for sensing the position of the first latch 106 and delivering a signal in response to the first latch 106 being at the second position. The sensing means 142 also includes a proximity sensor of any suitable well known construction. The sensing means 142 is mounted on the frame 22 in close proximity to the first latch 106 and senses when the bolt 110 of the first latch is positioned to engage teeth 112 of gear 72.

Means 144 is provided for sensing the position of the second latch 122 and delivering a signal in response to the second latch 122 being at the first position. The sensing means 144 preferably includes a proximity sensor which is mounted on the frame 22 and in close proximity to plunger 128 of the second latch 122. The sensing means 144 delivers a signal in response to the plunger 128 being at the extended position, the position at which the plunger 128 is engaged in the notch 130 of the plunger receiving member 126.

It is to be noted that means (not shown) equivalent to means 140,142,144 are also provided with the second indexing device. Such means are located, constructed, and operate in an identical manner to that of the means 140,142,144.

An encoder means 146 is provided for sensing the rotated position of the pinion gear 80 and deliver a control signal representative of the rotated position. The encoder means 146 is mounted on the indexing motor means 76 and responsive to rotation of the rotatable output shaft 78 of the indexing motor means 76. A control means 148 which includes a processor 150 and a motor/actuator controller 152 is connected to each of the sensing means 140,142,144 and the encoder means and receives the signals delivered from each of the sensing and encoder means. The processor 150 executes control commands based on pre-programmed instructions and is responsive to signals delivered from each of the sensing means 140,142,144 and encoder means 146. The motor/actuator controller 152 delivers electrical energy to the actuators 114,124 of the first and second latches 106,122 and to the indexing motor means 76 and the solenoid 105 in response to signals received from the processor 150.

The control means 148 in response to receiving signals from the indexing motor sensing means 140 and the first and second latch sensing means 142,144 delivers a signal to the motor/actuator control 152. The motor/actuator control 152 delivers a signal to the indexing motor means which commands the indexing motor means to rotate the chuck 64 to a preselected rotated position at which a particular rod bearing journal at its preselected position and aligned to be ground by the abrasive wheel 28 in response to receiving this signal.

The control means 148 which is connected to the solenoid 105 is adapted to deliver a signal to the solenoid and shift the solenoid from the second position 98 to the first position in response to receiving a signal from the control means 148. In particular the control valve 94 is shiftable to the first position 96 whenever the grinding operation of a particular rod bearing journal 30 is completed and the crankshaft requires rotation to another rod bearing journal grinding location.

The electrical actuators 114 and 124 are actuatable in response to receiving a signal from the control means 148 to move a respective latch 106,122 to one of the first and second positions. The position of the actuators 114,124 is based on preprogrammed instructions and feed back from the various sensors 140,142,144,146.

The drive motor means 40 which is connected to rotate the drive shaft 32 is connected to the control means 148 and particularly the motor/actuator control 152. The control means 148 delivers command signals to control the drive motor 40 based on preprogrammed instructions. Specifically the control means 1 48 commands the drive motor to rotate the drive shaft 32 in response to the indexing motor 76 being at the second position, the first latch 106 being at the first position, and the second latch 122 being at the second position. In this mode of operation rotation of operation is associated with the grinding of a crankshaft rod bearing journal 30.

The control means 148 also commands the drive motor means 40 to rotate the drive shaft 32 to the null position in response to the indexing motor being at the second position and the second latch 122 being at the second position. This mode of operation is associated with the indexing function and occurs prior to the crankshaft 24 being indexed (rotated) to the preselected position at which a rod bearing journal is aligned for grinding.

The control means 148 in response to position signals from the encoder means 146 commands the indexing motor means 76 to stop rotation of the crankshaft 24 at the preselected position of the crankshaft 24. The processor 150 executes command instructions to stop indexing motor means 76 rotation whenever the encoder signals received during the indexing operation indicate that the crankshaft 24 rod bearing journal is at the preselected location.

The first latch 106 is movable from the second position to the first position and second latch 122 is movable from the first position to the second position in response to the crankshaft rod bearing journal being at said preselected position. Movement of the first latch 106 to the second position is achieved by a command signal issued from the processor to the motor/actuator control 152 to deactivate the actuator 114. Movement of the second latch 122 from the first to the second position is accomplished in response to a signal from the processor to the motor/actuator control 152 to deactivate the electrical actuator 124 and cause the plunger 126 of the actuator 124 to move from engagement with the plunger receiving member 26. This mode of operation is associated with completion of the indexing of a rod bearing journal of the crankshaft.

It is to be noted that although the above discussion was in the singular with respect to the first and second latches 106,122 it is to be recognized that the discussion also relates to the first and second latches 132,134. It is also to be noted that the first and second indexing devices 14,16 are substantially identical with the exception that the first indexing device 14 has an indexing motor means 76, a drive motor means 40, and a power means 82 for moving the indexing motor means relative to the gear 72. The gear 74 of the second indexing device is provided for the latching function with the first latch 132 however it is to be recognized that the gear 74 could be eliminated and/or replaced with an equivalent device without departing from the spirit of the invention.

A first adjusting means 154 is provided for selectively changing the normal distance between the drive shaft 32 and the chuck spindle axis 44. The indexing device 14 also includes a second adjusting means 156 for changing the normal distance between the drive shaft axis 34 and an axis 158 of the pinion gear 80 and thereby maintain the normal distance between the drive shaft axis 34 and the chuck spindle axis 44 constant. As best seen in FIG. 3, the first adjusting means includes an elongated slot 160 disposed in a flange 120 and a key member 162 connected to the flange 136 and slidably movable in the slot 160. An adjusting screw 164 screw threadably connected to the flange 136 is engaged with the flange 120 and provides for adjustable movement of the chuck shaft 42 relative to the drive shaft 34 as guided by the slot 160 and key member 162. The second adjusting means 156 also includes a threaded screw equivalent to that of the first adjusting means 154. The flanges 120, 136 are connected together by threaded fasteners disposed in elongated slots which permit the above adjustment. Although not stated, the adjustment means 154,156 are provided on each of the first and second indexing devices 14,16.

Industrial Applicability

With respect to the drawings and in operation, the indexing arrangement 10 permits an existing grinder to be modified so that crankshafts of different types may be ground on a common machine with a minimum of setup time. Because the first and second indexing devices 14,16 are relatively compact the indexing devices may be applied to grinders not previously adaptable to automated indexing and grinding.

With reference to FIG. 1, each of the journals 30 of the crankshaft are indexible to lie along aligned axes 38, 34 that accurate grinding of each journal is achieved automatically and with ease. Each of the rod bearing journals 30 are sequentially moved to a pre-determined location relative to the rotatable abrasive wheel 28 of the grinder so that each of the journals 30 may be sequentially ground. Indexing of the crankshaft 24 comprises the steps of rotating the drive shaft 32 carrying a pot chuck 64 supported crankshaft 24 on the grinder 12 to a pre-determined null or set point position. This rotation is achieved by drive motor means 40 under control of the control means 148. The second latch 122 is then engaged by moving the plunger 128 into engagement with the plunger receiving member 126. This activity under control of the control means 148 maintains the drive shaft at the null position at from rotation about axis 34. The indexing motor means 76 is then moved by the power means 82 to the first position at which the pinion gear 80 is engaged with the gear 72. Upon completion of movement of the indexing motor means 76 to the first position, the first latch 106 which is normally biased into engagement with the gear teeth 112 is moved from engagement with the gear teeth 112 of gear 72. This frees the pot chuck for rotation about the chuck spindle 42 which is connected axially offset relative to the drive shaft 32. The indexing motor means 76 is then actuated by the control means 148 and the pot chuck 64 supported crankshaft is rotated to the desired bearing journal position relative to the abrasive wheel 28. As indicated before the rod bearing journal 30 position lies along the axis of rotation 34 of the drive shaft 32. The indexing motor means 76 is then moved to the second position at which the gear 72 is free from engagement with the indexing motor means 76. The second latch 122 is then disengaged by moving the plunger 128 from engagement with the notch 130. This frees the drive shaft 32 for rotation about the axis 34 under power of the drive motor means 140.

It is to be reiterated that each of the above steps is based on pre-programmed instructions stored in the processor 150 and in response to signals delivered from the various sensing means 140,142,144 and encoder means 146. The indexing motor means 76 is maintained from rotation and from rotating the gear 72 in response to the first latch 106 being at the gear 72 engaging position as sensed by the first latch sensing means 142. Similarly, the drive shaft 32 is maintained from rotation about its axis 34 in response to the second latch 122 being at the first and engaged position with the plunger receiving member 126. The second latch sensing means 144 senses the position of the second latch 122 and the control means 148 prevents powered operation of the drive shaft 32 in the absence of receiving a signal from the sensing means 144.

The position of the indexing motor means 76 relative to the ring gear is sensed by the sensing means 140. The drive shaft 32 is maintained from rotation whenever the indexing motor means 76 is in driving engagement with the gear 72. The control means 148 commands the drive motor means 40 to rotate the drive shaft 32 subsequent to completion of the above-identified journal bearing indexing steps. During grinding of the rod bearing journals 30 both the abrasive wheel 28 and the cam shaft are rotated. The axis 56 of the selected rod bearing journal 30 being ground lies along axis 34 of the drive shaft 32 so that accurate grinding of the particular rod bearing journal is achieved.

It is to be recognized that the above-noted steps which were described with respect to the first indexing device, the movement of the first and second latches 106,122, and the feedback delivered from the sensing means 140,142,144, and encoder 146 also relates to the second indexing device 16, the equivalent sensing means, and the first and second latches 132,134.

Other aspects, objects and advantages of the present invention can be obtained from a study of the drawings, the disclosure and the appended claims.

I claim:

1. A method for indexing one of a plurality of crankshaft bearing journals to one of a plurality of predetermined locations relative to a rotatable abrasive wheel of a grinder, comprising the steps of:
   rotating a drive shaft carrying a pot chuck supported crank shaft on the grinder to a predetermined null position, said pot chuck clampingly engaging said crankshaft and maintaining said crankshaft from rotation relative to said pot chuck;
   engaging a second latch and maintaining the drive shaft at the null position;
   moving an indexing motor pinion gear to a position at which the indexing motor pinion gear is in driving engagement with a gear connected to the pot chuck;
   releasing a first latch from rotation restraining engagement with the gear and freeing the pot chuck to rotate about a chuck spindle connected axially offset relative to the drive shaft;
   actuating the indexing motor and rotating together the pot chuck and supported crank shaft to a desired bearing journal position relative to the abrasive wheel;
   engaging the first latch with the gear and maintaining the pot chuck and supported crank shaft from rotation relative to the drive shaft;
   moving the indexing motor pinion gear to a position spaced from engagement with the gear;
   disengaging the second latch and freeing the drive shaft for rotation.

2. A method, as set forth in claim 1, including the steps of:
   sensing the position of the first latch; and
   maintaining the indexing motor from rotation in response to the first latch being at the gear engaged position.

3. A method, as set forth in claim 1, including the steps of:
   sensing the position of the second latch; and
   maintaining the drive shaft from rotation in response to the second latch being at the engaged position.

4. A method, as set forth in claim 1, including the steps of:
   sensing the position of the indexing motor relative to the gear; and
   maintaining the drive shaft from rotation in response to the indexing motor being in driving engagement with the gear.

5. A method, as set forth in claim 1 including the step of actuating a drive motor to rotate said drive shaft.

6. A method, as set forth in claim 1, where in the step of moving the indexing motor to the gear engaging position includes the steps of:
   delivering a signal to a solenoid operated control valve; and
   shifting the valve to a first position at which pressurized fluid flow is passed to a linear actuator connected to move said indexing motor.

* * * * *